United States Patent [19]

Dirks et al.

[11] Patent Number: 4,793,831
[45] Date of Patent: Dec. 27, 1988

[54] PROCESS FOR PURIFYING FLUE GASES

[75] Inventors: Friedrich Dirks, Gondelsheim; Wilhelm Hempelmann, Eggenstein, both of Fed. Rep. of Germany

[73] Assignee: Kernforschungszentrum Karlsruhe GmbH, Karlsruhe, Fed. Rep. of Germany

[21] Appl. No.: 67,249

[22] Filed: Jun. 26, 1987

[30] Foreign Application Priority Data

Jul. 3, 1986 [DE] Fed. Rep. of Germany ....... 3622290

[51] Int. Cl.$^4$ ............................................ B01D 50/00
[52] U.S. Cl. .......................................... 55/20; 55/22; 55/89; 55/90; 55/93; 55/DIG. 9; 252/630; 252/632; 422/159
[58] Field of Search .................... 55/20, 22, 89, 90, 93, 55/FIG. 9; 252/630, 632; 422/159

[56] References Cited

U.S. PATENT DOCUMENTS

| | | | |
|---|---|---|---|
| 2,578,315 | 12/1951 | Parker | 55/89 |
| 2,953,218 | 9/1960 | Coates | 55/89 X |
| 3,418,788 | 12/1968 | Sugimoto | 55/DIG. 9 X |
| 3,785,119 | 1/1974 | McIlvaine | 55/22 X |
| 3,984,217 | 10/1976 | Huntington | 55/20 |
| 4,229,411 | 10/1980 | Kisters et al. | 55/20 X |
| 4,251,236 | 2/1981 | Fattinger et al. | 55/89 X |
| 4,317,806 | 3/1982 | Leisegang | 55/89 X |
| 4,416,855 | 11/1983 | Abrams et al. | 422/159 X |

FOREIGN PATENT DOCUMENTS

| | | | |
|---|---|---|---|
| 211009 | 6/1984 | Fed. Rep. of Germany | 252/632 |
| 100800 | 6/1983 | Japan | 252/632 |
| 212799 | 12/1984 | Japan | 252/630 |
| 50500 | 3/1985 | Japan | 252/630 |
| 50499 | 3/1985 | Japan | 252/632 |

Primary Examiner—Kathleen J. Prunner
Attorney, Agent, or Firm—Spencer & Frank

[57] ABSTRACT

A process for purifying flue gases by conducting the hot gases through a dry purification stage, and then through a pebble bed evaporator containing pebbles and a liquid. The flue gases then exit the pebble bed evaporator and are washed in a wet washing step. Waste liquid containing dissolved material from the wet washing step is then used as the liquid in the pebble bed evaporator; as this liquid evaporates in the pebble bed evaporator, solid precipitate forms on the pebbles. This solid precipitate is removed from the evaporator and is stored. Vapor from the pebble bed evaporator is condensed and used in the wet washing step. The purified flue gases exiting the wet washing step pass through a filter stage and are discharged.

6 Claims, 1 Drawing Sheet

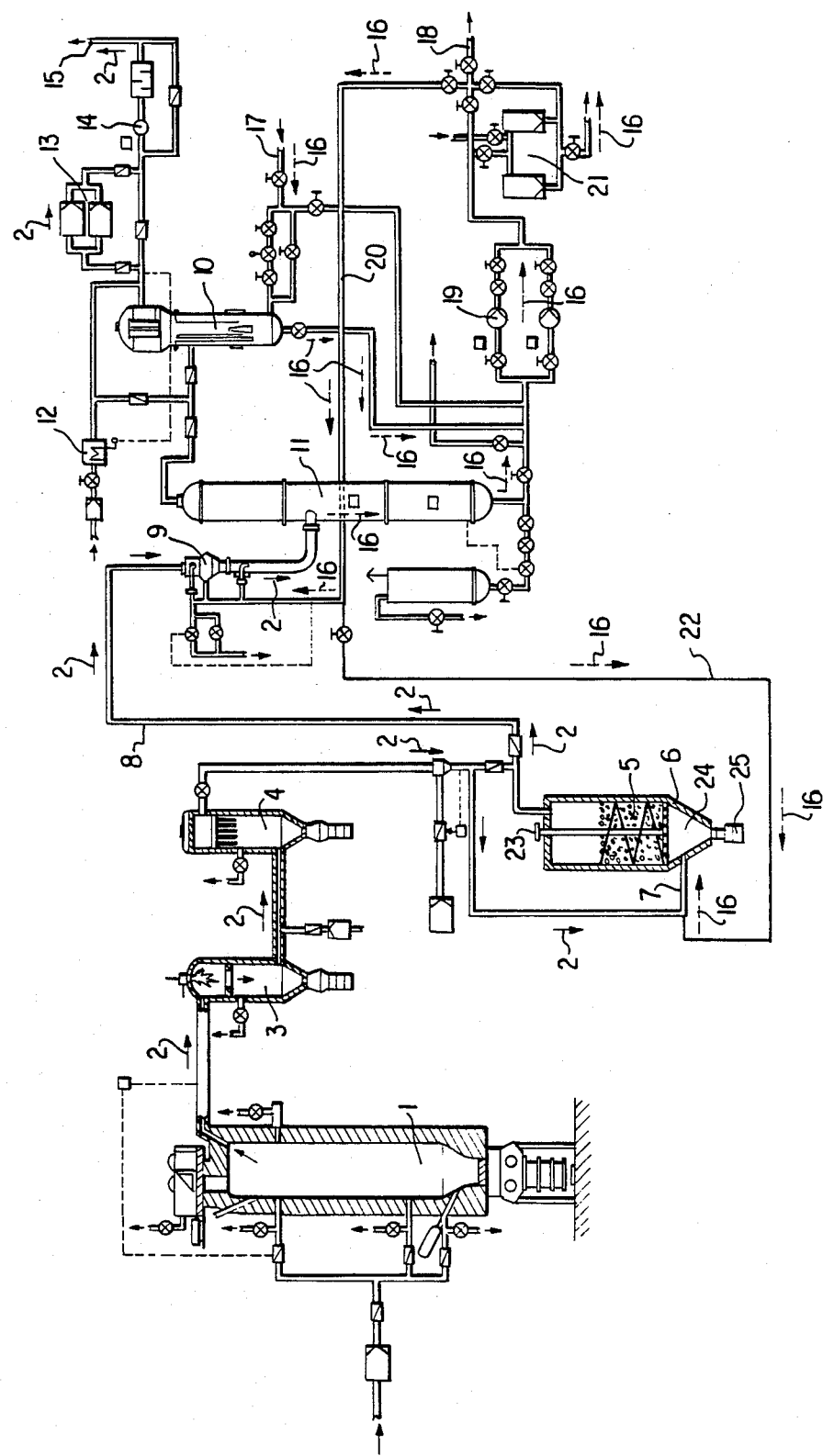

PROCESS FOR PURIFYING FLUE GASES

FIELD OF THE INVENTION

The present invention relates to a process for purifying flue gases.

TECHNOLOGY REVIEW

Wastes of the type of household trash and particularly radioactive wastes from nuclear plants contain PVC and PTFE. If burned, these substances produce chlorides and fluorides which, according to existing regulations, are permitted to be discharged into the environment only in limited quantities. Similar problems occur for halogen oxides and $SO_2$. It is known in the purification of flue gases to control such emissions by the incorporation of a flue gas washer. Such flue gas washers have the drawback that they produce large quantities of high salt content waste solutions. By appropriate chemical treatment, such waste solutions can be converted to gypsum or other solids. However, in the case of incineration systems for radioactive wastes, such substances are radioactive and cannot be stored directly in the form obtained after flue gas washing. For that reason, the radioactive waste concentrates obtained from the washers must be converted to the solid state with the aid of cement. This results in additional secondary wastes which must be stored as radioactive wastes. Moreover, the process requires expensiee methods outside the actual incineration system.

In an incineration system in operation, the washing concentrate, which is enriched with salt to a content of about 22% to 25% is discharged after a period of operation of about 30 hours and is solidified with cement in a cementing system. This produces 8 barrels containing 200 liters of radioactive waste per charge. In systems operated, for example, in some countries, these radioactive waste waters are diluted by the continuous addition of fresh water so that they can be discharged to the main drainage channel. However, for environmental protection reasons, such a radioactive solution should not be discharged into the environment.

In prior processes, the compaction factor of an incineration system is considerably reduced by the described additional secondary wastes, particularly for radioactive wastes. Among others, the necessary emptying of the washer reduces the compaction factor of an incineration system from about 1:60 to between about 1:6 to 1:10. In other processes which discharge the concentrate in diluted form to a main drainage channel, the radioactivity already captured in the washers is released again and thus the environment is contaminated.

The conventional emission of an incineration system for radioactive wastes or for conventional household trash must be reduced to the greatest extent possible. Additionally and primarily in the case of an incineration system for radioactive wastes, the so-called "secondary waste" generated during washing is to be reduced to a minimum. The radioactivity retained in the washer should not be released but converted, within the plant, into a form suitable for permanent storage. This should not require additional energy but should utilize the energy used for the incineration.

SUMMARY OF THE INVENTION

The invention provides a process for the purification of flue gases, suitable for use with flue gases from incineration systems for radioactive wastes whose washing concentrate residues are put into permanent storage in solidified form, comprising steps for:

(a) conducting a hot flue gas, through at least one dry cleaning stage, through a pebble bed evaporator to heat pebbles disposed therein, and through at least one wet washing stage to form a salt enriched liquid;

(b) returning at least part of the salt enriched liquid from said wet washing stage into said pebble bed evaporator;

(c) evaporating water from said salt enriched liquid in said pebble bed evaporator and precipitating solid residues on the surfaces of pebbles disposed in said pebble bed evaporator;

(d) removing the solid residues from the pebble bed evaporator;

(e) conducting evaporated water and flue gas from said pebble bed evaporator, into said wet washing stage to form a purified flue gas; and (f) discharging the purified flue gas downstream of said wet washing stage through at least one further filter stage.

The present invention provides considerable savings in the conversion of the wastes to a form suitable for permanent storage. According to the process of the invention the residues from the flue gas wash are available in solid form and the water originally contained therein need no longer also be solidified and put into permanent storage. The present invention makes it possible to operate a flue gas washer on the intake side of the blower and upstream of an optionally installed suspended particle filter, upstream of the discharge. The invention makes it possible to always keep the quantity of water in the washer constant without the requirement for slurry removal. Washing liquid, e.g. fully desalinated water, is utilized to cool the flue gases. At the same time, in a pebble bed evaporator, the water circulating in the washer is constantly freed of the salts contained therein. At the same time, part of the radioactive substances contained in the washer when radioactive flue gases are washed is discharged together with the salt so that no enrichment of radioactive substances can develop in the washer either. The pebble bed evaporator provided for the process of the invention operates with the energy generated in the incineration furnace itself so that, except for operation of a stirring motor, no additional energy need be supplied. The degree of purification provided by the washer can be varied by increasing or reducing the quantity of liquideextracted from the washer and fed to the pebble bed evaporator. The pebble bed evaporator simultaneously operates as a cooling element and produces an additional filtering effect due to the presence of the pebble bed. The product bbtained in the pebble bed evaporator is similar to the ashes from the hot gas filters of the system and can be converted to a form suitable for permanent storage by pelletization together with the ashes from the incineration furnace and from broken filtering candles from the filter stages.

It is therefore an object of the present invention to reduce to a minimum, in a process of the above-described type, the residues from the flue gas washing process and, for example, in the combustion of radioactive substances, to minimize the so-called "secondary waste" generated during the washing which must then be converted to the solid state without the use of additional energy and without one being forced to release further radioactive liquids by way of dilution.

BRIEF DESCRIPTION OF THE DRAWING

The drawing FIGURE is a basic circuit diagram of a system in which the process according to the invention is to be employed.

DETAILED DESCRIPTION OF THE INVENTION

In a particularly advantageous manner the present invention provides a process to combine flue gas washing with hot gas filtering or other filters of an incineration system for radioactive or conventional wastes, without generating more than negligible quantities of secondary wastes. The minimum amount of secondary waste generated is similar in shape and composition to the ashes obtained in the incineration furnace. By varying the partial stream from the wet washing stages being dried in the pebble bed evaporator, the degree of purification of the washing stages can be regulated as a function of the temperature. At the same time, part of the radioactivity is constantly removed from the washer and converted into the above-mentioned form suitable for storage. With this combination of hot gas filter stage, evaporator and washer, radioactive and conventional contaminants are removed simultaneously with a minimum amount of "secondary waste".

Advantageously, suspended particle filters may be arranged downstream of the washer. Due to the low temperatures involved, these filters can be operated at a lower temperature downstream of the wet washing stages. Since the dryer simultaneously serves as a type of preliminary filter, a defect in the hot gas filtering stage will create merely a short-term rise in the differential pressure of the dryer and cause the washer to be temporarily soiled. These measures can be reversed by increased return of washing liquid and by increasing the number of revolutions of the stirring mechanism in the pebble bed evaporator so that sufficient time for repair of the hot gas filter is available. Due to this arrangement, the series connection of two flue gas filters can be omitted. The additional expenditures for the installation of a pebble bed evaporator are therefore compensated by the elimination of one hot gas filter stage.

DESCRIPTION OF A PREFERRED EMBODIMENT

The flue gases generated in incineration furnace 1 are conducted, in the circuit diagram according to the drawing figure, in the direction of the solidly drawn arrows 2 (gas path) and, after further combustion in post-incineration chamber 3 and preliminary filtering in a dry hot gas filter 4, for example a candle filter employing ceramic candles, pass through the pebble fill 5 of a pebble bed evaporator 6. The intake 7 for the flue gas laterally opens into evaporator 6 below the pebble fill 5 so that the flue gas flows through pebble fill 5 from the bottom to the top and heats the pebbles. However, a reverse direction of flow, from the top to the bottom, is also possible.

From pebble bed evaporator 6, the flue gas is conducted through conduit 8 to the multi-stage flue gas washing process which, in the illustrated case, is composed, for example, of a jet washer 9 as stage one, a Venturi washer 10 as stage two and a washing column 11 connected therebetween.

In the washing stages, the flue gas on gas path 2 is freed from its contaminants by intensive washing with a neutral or alkali washing liquid. Downstream of washing stages 9, 10 and 11, the flue gas is heated by added air which has been heated in heater 12 so that the temperature of the flue gas upstream of the suspended particle filter stages 13 comes to a temperature above the dew point. The gas sucked in with the aid of a blower 14 may also be heated directly, circumventing filter stages 13, and conducted directly into exhaust air chimney 15.

The washing liquid used for wasiing, e.g. fully desalinated water, is conducted in circulation in the direction of the dashed arrows 16 (liquid path). From water inlet 17, the washing liquid is initially conducted to Venturi washer 10, i.e. it is injected into the washer from the bottom and then flows back from there by means of pumps 19 in the direction of outlet 18. Part of this liquid or fresh water which has been mixed in is branched off before outlet 18 and conducted by means of conduit 20 to the preceding washing stages, jet washer 9 and washing column 11. Pumps 19 also pump the washing liquid flowing out of these stages to outlet 18. Bag filters 21 are connected upstream of outlet 18 so as to remove possibly existing coarse impurities. The water evaporated during circulation is replenished by the constant addition of fully desalinated water to the circuit. The water required for evaporation is simultaneously utilized for rinsing the shaft seals of the pump. The washing liquid is constantly kept in a pH range favorable for washing out the emissions by the addition of caustic soda solution or other chemicals, such as, for example, lime milk.

To prevent the accumulation of salt in the washing liquid circulating in circuit 16, a partial stream of the washing liquid is constantly sprayed into pebble bed evaporator 6 and is there evaporated underneath or in the pebble fill 5. The liquid is returned through return conduit 22 which comes from conduit 20 upstream of wet washing stages 9, 10, and 11 and opens into the intake 7 for the gas shortly before it reaches pebble bed evaporator 6. The evaporated or vaporized washing liquid is thus conducted through the pebble fill.

The salts contained in the washing liquid are deposited on the heated pebbles of pebble fill 5 and are dried there. The pebbles are kept in constant motion by a stirring mechanism 23. Due to the abrasive action of the pebbles, the salts drop through a perforated metal sheet into a chamber 24 disposed underneath pebble fill 5 and are collected there. From time to time, the salts are removed in that a flap is opened to discharge them into a barrel 25 disposed underneath pebble bed evaporator 6. These salts are later mixed with the ashes of incineration furnace 1 and together with these ashes are subjected to further compaction by pressing them in a high pressure press (not shown). The resulting product meets present permanent storage requirements.

Washing liquid is added at the flue gas entrance side of the pebble bed evaporator 6. The entrance temperature of the flue gases into the evaporator 6 may fluctuate between about 350° C. and 500° C. The exit temperature from evaporator 6 lies in a range of about 100° C. and higher. The exit temperature may be varied by regulating the added quantity of washing liquid. Generally, stirring mechanism 23 is operated at a minimum velocity of 1 to 3 revolutions per minute. Only if there is clogging, will the number of revolutions briefly be increased to reduce the differential pressure of pebble bed evaporator 6 by increasing the abrasion on the pebbles. Pebble bed evaporator 6 is situated between not gas filter stage 4 and wet washing stages 9, 10 and 11. It can be operated in the main circuit as well as in a secondary circuit; switching is then effected by means of appropriately switched valves in the conduits.

The present disclosure relates to the subject matter of our patent application No. P 36 22 290.9 filed in the Federal Republic of Germany on July 3rd, 1986, the entire specification of which is incorporated herein by reference.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

We claim:

1. A process for the purification of flue gases, suitable for use with flue gases from incineration systems for radioactive wastes whose washing concentrate residues are put into permanent storage in solidified form, comprising the following process steps:
    (a) conducting a hot flue gas, through at least one dry cleaning stage, through a pebble bed evaporator to heat pebbles disposed therein, and through at least one wet washing stage to form a salt enriched liquid;
    (b) returning at least part of the salt enriched liquid from said at least one wet washing stage into said pebble bed evaporator;
    (c) evaporating water from said salt enriched liquid in said pebble bed evaporator and precipitating solid residues on the surfaces of the pebbles disposed in said pebble bed evaporator;
    (d) removing the solid residues from the pebble bed evaporator;
    (e) conducting evaporated water and flue gas from said pebble bed evaporator into said at least one wet washing stage to form a purified flue gas; and
    (f) discharging the purified flue gas downstream of said at least one wet washing stage through at least one further filter stage.

2. The process set forth in claim 1, wheeein step (d) comprises:
    ($d_1$) abrading the solid residues precipitated on the pebbles disposed in said pebble bed evaporator;
    ($d_2$) discharging and collecting the abraded solid residues through the pebbles disposed in said evaporator into a chamber disposed below said pebbles; and
    ($d_3$) filling the abraded solid residues from the chamber into a transporting barrel.

3. The process set forth in claim 2, including mixing the abraded solid residues with the ashes of an incineration furnace.

4. The process set forth in claim 2, further comprising process steps:
    (g) controlling a discharge temperature of the hot flue gas downstream of the pebble bed evaporator by varying the quantity of returned washing liquid; and
    (h) raising the temperature of the flue gas downstream of said at least one wet washing stage to above the dew point.

5. The process set forth in claim 1, further comprising process steps:
    (g) controlling a discharge temperature of the hot flue gas downstream of the pebble bed evaporator by varying the quantity of returned washing liquid; and
    (h) raising the temperature of the flue gas downstream of said at least one wet washing stage to above the dew point.

6. The process set forth in claim 1, wherein said hot flue gas contains radioactive waste.

* * * * *